United States Patent
Manushyn et al.

(10) Patent No.: US 11,870,380 B2
(45) Date of Patent: Jan. 9, 2024

(54) ACTUATING THREE-PHASE INDUCTIVE LOADS IN THE PARTIAL-LOAD OPERATING MODE WITH REDUCED INVERTER SWITCHING LOSSES

(71) Applicant: Robert Bosch GmbH, Stuttgart (DE)

(72) Inventors: Illia Manushyn, Pegnitz (DE); Jochen Wessner, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 66 days.

(21) Appl. No.: 17/776,744

(22) PCT Filed: Sep. 24, 2020

(86) PCT No.: PCT/EP2020/076682
§ 371 (c)(1),
(2) Date: May 13, 2022

(87) PCT Pub. No.: WO2021/099012
PCT Pub. Date: May 27, 2021

(65) Prior Publication Data
US 2022/0416710 A1   Dec. 29, 2022

(30) Foreign Application Priority Data
Nov. 18, 2019   (DE) ..................... 10 2019 217 688.7

(51) Int. Cl.
*H02P 27/08* (2006.01)
*H02M 7/5387* (2007.01)

(52) U.S. Cl.
CPC ........ *H02P 27/08* (2013.01); *H02M 7/53871* (2013.01)

(58) Field of Classification Search
CPC ........ H02P 27/08; H02P 21/22; H02P 27/085; H02P 25/22; H02P 2209/01;
(Continued)

(56) References Cited

U.S. PATENT DOCUMENTS

| | | | |
|---|---|---|---|
| 10,320,323 B1* | 6/2019 | Wu | ......................... H02P 21/22 |
| 2009/0200971 A1 | 8/2009 | Waji et al. | |
| 2011/0164443 A1 | 7/2011 | Chen et al. | |

FOREIGN PATENT DOCUMENTS

| | | |
|---|---|---|
| DE | 102004027629 A1 | 1/2006 |
| EP | 2536019 A1 | 12/2012 |

(Continued)

OTHER PUBLICATIONS

Translation of International Search Report for Application No. PCT/EP2020/076682 dated Dec. 16, 2020 (2 pages).

*Primary Examiner* — Antony M Paul
(74) *Attorney, Agent, or Firm* — Michael Best & Friedrich LLP

(57) ABSTRACT

The invention relates to a method (100) for operating an inverter (1) which selectively connects each of three alternating current phases (U, V, W) of an inductive load (4) to the plus pole or minus pole of a direct current (2) provided at the input (1*a*) of the inverter (1) by actuating switching elements (3*a*-3*f*) arranged in three half bridges (5*a*-5*c*), wherein the switch states of the switching elements (3*a*-3*f*) are modified (110) by a rotating space vector modulation. Additionally, in the event of a modulation between space vectors (6*a*-6*f*) which have the same switch element (3*a*, 3*d*; 3*b*, 3*e*; 3*c*, 3*f*) switch states with respect to at least one half bridge (5*a*-5*c*), such a half bridge (5*a*-5*c*) remains completely deactivated (120).

8 Claims, 2 Drawing Sheets

(58) Field of Classification Search
CPC ...... H02P 2201/03; H02P 21/24; H02P 21/34; H02P 25/03; H02P 6/085; H02P 25/022; H02P 21/30; H02P 23/00; H02P 27/04; H02P 27/00; H02P 27/06; H02P 21/00; H02P 21/20; H02P 23/07; H02P 23/14; H02P 6/00; H02P 6/08; H02P 6/06; H02P 6/10; H02P 6/12; H02P 6/14; H02P 6/28; H02P 7/29; H02P 1/00; H02P 1/16; H02P 1/24; H02P 1/26; H02P 1/42; H02P 1/46; H02P 3/00; H02P 25/107; H02P 29/00; H02P 29/032; H02P 2201/05; H02M 7/53871; H02M 7/5387; B60L 58/20; B60L 2220/56; B60L 2200/40; B60L 2220/58; B60L 2240/547; B60L 2240/549; B60L 50/51

See application file for complete search history.

(56) References Cited

FOREIGN PATENT DOCUMENTS

| | | | |
|---|---|---|---|
| JP | H07298631 | A | 11/1995 |
| JP | 2001224198 | A | 8/2001 |
| JP | 2004312822 | A | 11/2004 |
| JP | 2007110780 | A | 4/2007 |

\* cited by examiner

ACTUATING THREE-PHASE INDUCTIVE LOADS IN THE PARTIAL-LOAD OPERATING MODE WITH REDUCED INVERTER SWITCHING LOSSES

BACKGROUND OF THE INVENTION

The present invention relates to the operation of three-phase inductive loads using inverters, wherein the rms current is preset by means of pulse-width modulation.

In an electric drive system which converts electrical energy into mechanical energy, preferably three-phase or polyphase AC motors are used which have good efficiency and, in contrast to DC motors, manage without brushes which are susceptible to wear. Such drive systems are used, for example, in elevators, in pumps and in drivetrains for electrically driven vehicles. Electrical energy sources which can be carried along in the vehicle such as, for example, batteries or fuel cells generally produce a DC voltage, however. For industrial applications, three-phase alternating current is generally used which is rectified by a rectifier.

In order to convert the DC voltage into a three-phase or polyphase AC voltage, inverters are used.

In this case, the demands on the torque and the speed permanently change during driving operation. Thus, in order to accelerate, a higher speed is required, and in order to maintain the speed on an incline, a higher torque is required. The inverter can vary both the frequency and the rms current intensity of the alternating current within wide limits. The conversion into alternating current by means of quick clocking over time of power semiconductors in the inverter costs energy, however. DE 10 2004 027 629 A1 discloses a method for pulse-width modulation with which, during the generation of a sinusoidal three-phase AC voltage by means of an inverter, some of the switching losses can be avoided.

SUMMARY OF THE INVENTION

Within the scope of the invention, a method for operating an inverter has been developed which connects three AC phases of an inductive load (for example of a synchronous machine) in each case optionally to the positive terminal or negative terminal of a DC voltage provided at the input of the inverter by means of driving of switching elements arranged in three half-bridges. The switching elements can in particular be in the form of power semiconductors, for example. In this case, the switching states of the switching elements are changed by means of revolving space vector modulation. In the space vector illustration, the current distribution over the three phases is characterized by the modulus, the real part or the imaginary part of the space vector, on the one hand, and the angle of the space vector with respect to a coordinate axis, on the other hand. In this connection, "revolving" means in particular that, by means of the modulation, new resultant space vectors are generated again and again and the angles of these space vectors change continuously in a consistent direction of rotation.

Since each half-bridge can connect the AC phase associated with it only either to the positive terminal or the negative terminal of the DC voltage, with steady-state switching states of the switching elements only a maximum of $2^3=8$ different space vectors can be illustrated. These space vectors on their own are insufficient for driving, for example, an electric motor causing it to rotate. For this purpose, a multiplicity of further space vectors are also required which lie between the few settable space vectors. As part of the space vector modulation, by alternate application of settable space vectors which are adjacent in the positive or negative direction of the angle or in the zero state, in pulse-width modulation the further space vectors lying in each case between these settable space vectors are generated.

In the case of a modulation between space vectors which have identical switching states of the respective switching elements with respect to at least one half-bridge, now such a half-bridge remains completely switched off.

In the case of the conventional space vector modulation, only switching states are permitted in which each half-bridge connects the phase associated with it either to the positive terminal or to the negative terminal of the DC voltage. Therefore, in each half-bridge, there is always precisely one switching element switched on and the other switched off. Switching states in which the two switching elements in a half-bridge are switched off do not occur. The introduction of precisely such switching states changes the respectively associated space vectors and therefore results in the time characteristics of the currents flowing through the AC phases, which time characteristics are ultimately formed during the space vector modulation, differing from the sinusoidal form. In contrast, all of the switching operations on the completely switched-off half-bridge are avoided. It has been identified that, precisely during actuation of inductive loads, the deviation from the sinusoidal form in many cases does not impair the function performed in each case by the load. Therefore, the time program of the switching operations can be "compressed with losses" in the described way. The situation is to a certain extent comparable with the compression of images, audio data and video data where the transition from loss-free to lossy compression methods increases the efficiency of the compression into new orders of magnitude.

In a particularly advantageous configuration, within a coherent sector in the space vector diagram in which the switching state of the switching elements associated with at least one half-bridge remains the same, such a half-bridge is completely switched off. "Coherent" should in this case be understood to mean in the positive or negative direction of the angle of the space vector.

It has been identified that, in the space vector diagram in the positive or negative direction of the angle, there are sequences of a first, second and third space vector such that, owing to a change in the switching state of a first half-bridge, a change can be made from the first space vector to the second space vector and, owing to a subsequent change in the switching state of a second half-bridge, a change can be made from the second space vector to the third space vector. In the sector enclosed by the first space vector and the third space vector, therefore, the progress is overall only characterized by changes in the switching states of two half-bridges. The switching state of the third half-bridge therefore does not add any further information and nothing important is lost when the third half-bridge remains completely switched off.

In a further advantageous configuration, the space vector modulation only takes place between so-called active space vectors. The active space vectors represent states in which a voltage which is different than zero is present between at least two of the AC phases. Besides, so-called zero-voltage space vectors also exist which represent switching states in which all three AC phases are short-circuited with respect to one another. If a sinusoidal rotating field is intended to be generated by space vector modulation, these zero-voltage space vectors are also required. Since, however, as part of the method, owing to the complete switch-off of half-bridges, the departure from the exact sinusoidal form of the generated alternating currents is nevertheless already "a done deal", the switching operations required for applying the zero-voltage space vectors can likewise be avoided.

In a particularly advantageous configuration, the space vector modulation is subjected to open-loop and/or closed-loop control with the aim that a three-phase alternating current with a preset rms value which commutates in the sense of a rotating field flows through the inductive load. Precisely in such applications it is in particular not a question of the precise time characteristic of the currents within a period of the alternating current as long as the rms value corresponds to the preset. The "smartening" of this time characteristic towards a sinusoidal form is therefore not necessary for the technical function of the inductive load, but merely costs switching operations.

The inductive load can particularly advantageously be an electric motor. In order to excite and maintain a rotation of the motor, it is merely necessary that resultant magnetic forces arise at any time between the stator and the rotor which continue to drive the rotation. This does not necessarily presuppose that the excitation of the magnetic coils of the motor has a precisely sinusoidal characteristic over time.

In a further particularly advantageous configuration, the motor is operated in star-connected fashion. This means that the three windings of the motor which are supplied power by the three AC phases have a common neutral point. This neutral point is not grounded.

In this configuration, a current which has flowed, for example, starting from the positive terminal of the DC voltage from a half-bridge of the inverter through a winding of the motor can only pass through the other two windings in the other half-bridges of the inverter and from there ultimately back to the negative terminal of the DC voltage in order to close the circuit. Completely switching off a half-bridge here has the effect that now only one half-bridge instead of two is available for the return circuit to the negative terminal of the DC voltage. This means, however, that the current on the path from the neutral point to the negative terminal no longer needs to overcome a parallel circuit of the two other windings but a specific one of the windings. Since each winding has an unavoidable impedance, the current therefore overall needs to overcome a higher impedance.

This results in a lower voltage drop across each winding and therefore overall less electrical power being converted in the motor. At the same time, in each case there is less of a voltage drop across the switching elements of the inverter as well. If these switching elements are power semiconductors (such as, for example, transistors), then the forward losses of these semiconductors, which are then added to the switching losses, are reduced. The forward losses are dependent both on the voltage drop across the switching element and on the electrical current respectively allowed to pass through.

The reduced power consumption conversely means that the motor can output less mechanical power. In the full-load operating mode, therefore, the function of the motor would be reduced. However, the method is specifically intended for the partial-load operating mode and the no-load operating mode of motors and other inductive loads.

It has been identified that precisely in the partial-load operating mode or even no-load operating mode of electric motors, the proportion of the switching losses of the total losses markedly increases: when the required rms current is reduced by a factor of 20, the switching losses in accordance with the existing prior art are reduced merely by a factor of 2. In the no-load operating mode, the efficiency of the inverter can thus fall to below 25%. In this case, a marked improvement is now effected in order that the characteristic of the current over time deviates more or less markedly from the sinusoidal three-phase alternating current. However, the current ripple of the current is uninfluenced because the PWM frequency still remains fixed. Precisely in the partial-load operating mode and no-load operating mode, however, a reduction in the maximum power output of the electric motor which is effected by the increase in the resistance, and possibly additionally also by the deviation from the sinusoidal form, is inconsequential. Much more important is the improvement of the efficiency of the inverter.

Many drive systems are typically only run at top speed for a very small proportion of their operating time. Correspondingly, the partial-load operating mode and the no-load operating mode together make up the greatest proportion of the operating time of the electric drivetrain. With the proposed method, the efficiency of the system in the partial-load operating mode is markedly improved.

Therefore, owing to the reduction in the switching losses, quite notable quantities of energy are saved, which is particularly advantageous during use in the drivetrain of a vehicle. Since vehicles generally carry along a limited energy reserve, the saved energy is also reflected in an extended range.

Therefore, advantageously an operating phase of the inductive load is selected in which the inductive load is operated at a maximum of 20%, preferably at a maximum of 10%, and very particularly preferably at a maximum of 5%, of its rated power.

The method can in particular be wholly or partially computer-implemented. Therefore, the invention also relates to a computer program with machine-readable instructions which, when implemented on one or more computers, instruct the computer(s) to implement the method. In this sense, control devices for vehicles and embedded systems for technical devices which are likewise capable of implementing machine-readable instructions should also be considered as computers.

Likewise, the invention also relates to a machine-readable data carrier and/or a download product having the computer program. A download product is a digital product which can be transmitted over a data network, i.e. can be downloaded by a user of the data network, and which can be offered for sale, for example in an online shop for immediate download.

Furthermore, a computer can be equipped with the computer program, with the machine-readable data carrier or with the download product.

BRIEF DESCRIPTION OF THE DRAWINGS

Further measures improving the invention will be illustrated in more detail below together with the description of the preferred exemplary embodiments of the invention with reference to figures.

In the figures.

DETAILED DESCRIPTION

Figure 1:
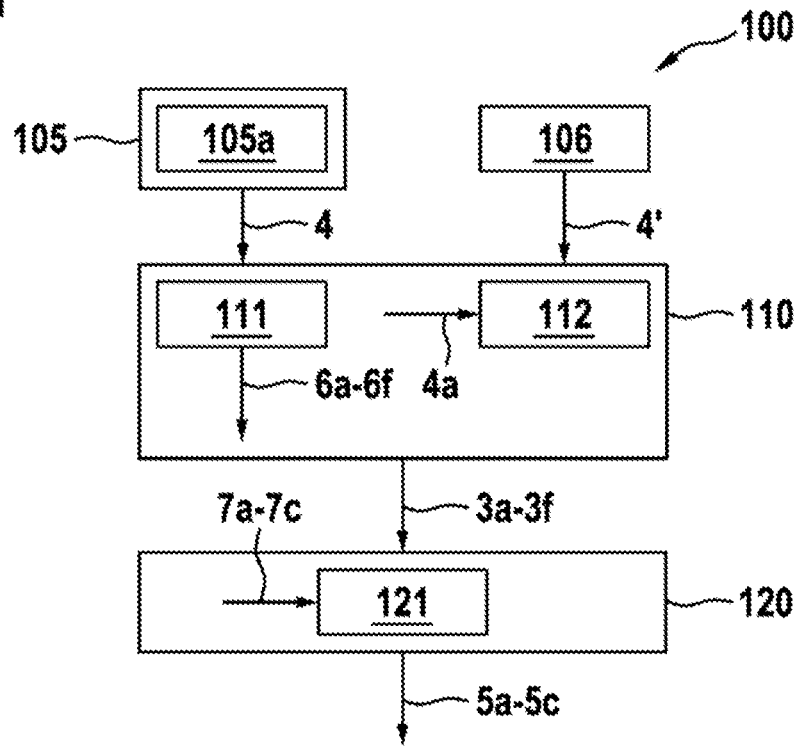
FIG. 1 shows an exemplary embodiment of the method 100.
Figure 3:
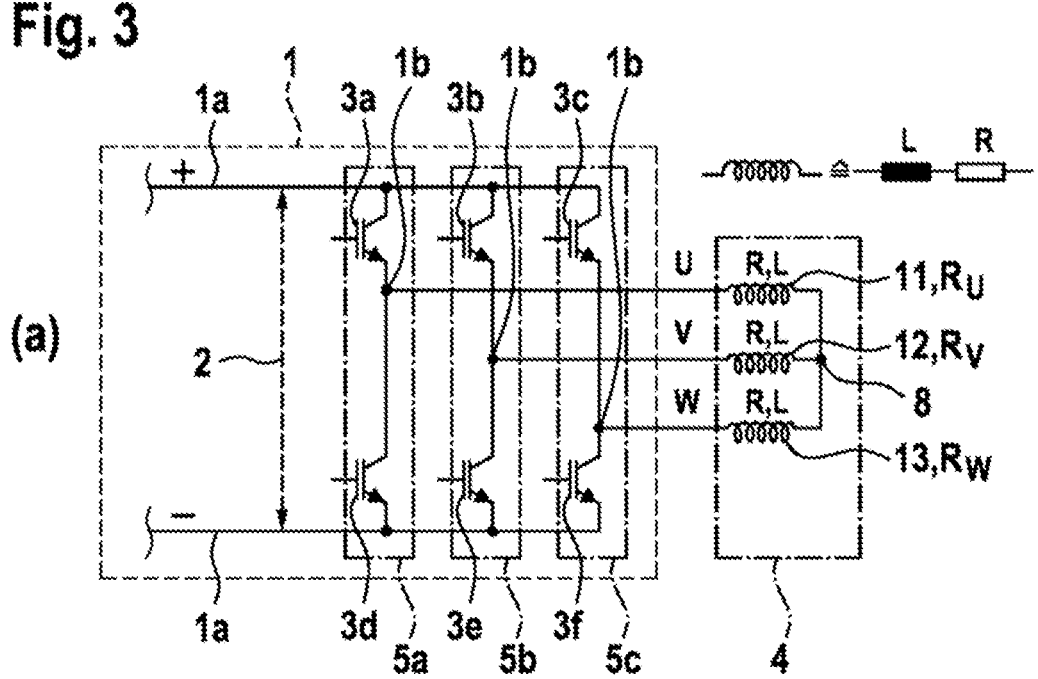
FIG. 3 shows an exemplary application of the method 100 using an inverter 1 with an electric motor as inductive load 4.
Figure 3:
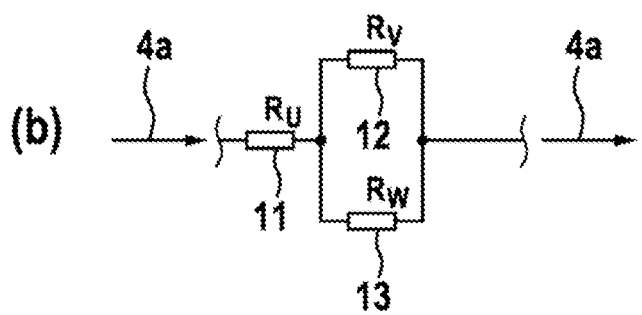
Figure 3:
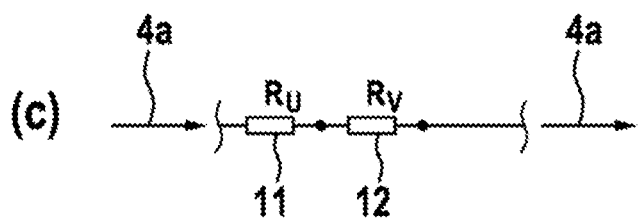

FIG. 1 illustrates an exemplary embodiment of the method 100 for operating an inverter 1. The inverter 1 itself is illustrated in more detail in FIG. 3.

In step 110, the switching states of the switching elements 3a-3f of the inverter 1 are changed by revolving space vector modulation. In accordance with step 120, in each case one half-bridge 5a-5c for which the space vectors 6a-6f just used in the modulation preset identical switching states remains completely switched off.

In this case, in this exemplary embodiment, in step 105 an electric motor is selected as inductive load 4. In accordance with block 105a, this electric motor is operated in star-connected fashion with an ungrounded neutral point 8.

In step 106, a partial-load operating phase 4' of the inductive load 4 is selected as that operating phase in which half-bridges 5a-5c remain completely switched off and the revolving space vector modulation is modified to this extent.

Within box 110 it is illustrated by way of example how the revolving space vector modulation can be configured in more detail.

In accordance with block 111, the space vector modulation can take place in particular only between active space vectors 6a-6f. In contrast to the so-called zero-voltage space vectors, active space vectors represent states in which a voltage different than zero is present between at least two of the AC phases U, V, W. When no zero-voltage space vectors are used, the common-mode current is advantageously reduced.

In accordance with block 112, the space vector modulation, in particular by means of corresponding open-loop and/or closed-loop control, can be aimed at having a three-phase alternating current 4a with a preset rms value which commutates in the sense of a rotating field flowing through the inductive load 4.

In accordance with block 121, within a coherent sector 7 in the space vector diagram in which the switching state of the switching elements 3a, 3d; 3b, 3e; 3c, 3f associated with at least one half-bridge 5a-5c remains the same, such a half-bridge 5a-5c can remain completely switched off.

Figure 2:
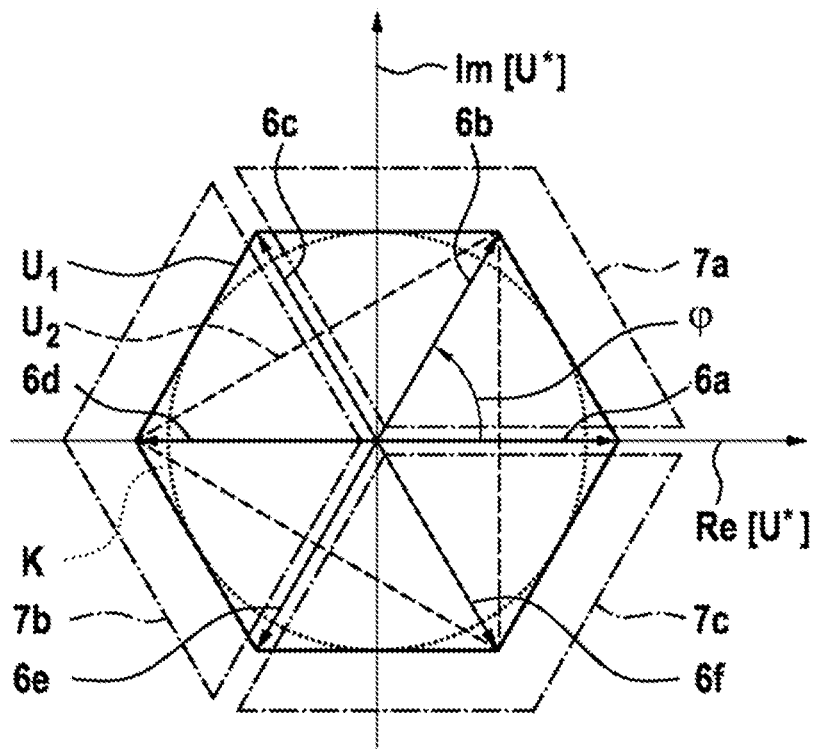
FIG. 2 shows an illustration of the space vector modulation.

FIG. 2 illustrates the space vector modulation using a space vector diagram. Illustrated are the six active space vectors 6a-6f. The coordinate axes represent the real part and imaginary part of the complex AC voltage U*. In Table 1, the associated switching states of the half-bridges 5a-5c and their switching elements 3a-3f are specified.

The space vectors 6a, 6b and 6c, which follow one another in the positive direction of rotation of the angle φ, have in common that the two switching elements 3c and 3f of the half-bridge 5c each remain in the same switching states. Therefore, the space vectors 6a and 6c enclose a sector 7a, in which the switching state of the half-bridge 5c is constant. When now the half-bridge 5c remains completely switched off (i.e. both switching elements 3c and 3f are continuously "off") within this sector 7a, which is illustrated in Table 1 by a bold border, two switching operations are avoided: during the transition from space vector 6c to space vector 6d, the switching element 3f does not need to be switched off since it is already off. Likewise, during the transition from space vector 6f to space vector 6a, the switching element 3f does not need to be switched on since it should remain switched off.

Similarly, the space vectors 6c and 6e enclose a second sector 7b, in which the switching state of the first half-bridge 5a is constant. Within this sector 7b, which is illustrated in Table 1 by a dotted border, the first half-bridge 5a can remain completely switched off.

The space vectors 6e and 6a enclose a third sector 7c, in which the switching state of the second half-bridge 5b is constant. Within this sector 7c, which is illustrated in Table 1 by a dashed border, the second half-bridge 5b can remain completely switched off.

These changes mean that the ultimate time characteristic of the alternating current 4a driven by the inductive load 4 deviates more or less markedly from the sinusoidal form. For a sinusoidal output current, only space vectors which lie on the circle K in the space vector diagram could be used. This would not only necessitate the active switching of all three half-bridges 5a-5c, but also the addition of zero-voltage space vectors. As a result, in total many more switching operations of the switching elements 3a-3f would be necessary.

Completely switching off half-bridges 5a-5c has the effect that only the space vectors 6b, 6d and 6f with the full rated voltage $U_1$ can be switched. Therefore, the pulse-width modulation can only modulate between the three space vectors 6b, 6d and 6f. Therefore, it is only possible using the pulse-width modulation to generate those resultant space vectors which end on the dashed connecting paths between

TABLE 1

| Space vector modulation (without deactivation of half-bridges 5a-5c) | | | | | | |
|---|---|---|---|---|---|---|
| Half-bridge | 5a | | 5b | | 5c | |
| Switching element | 3a | 3d | 3b | 3e | 3c | 3f |
| Space vector | | | | | | |
| 6a | on | off | off | on | off | on |
| 6b | on | off | on | off | off | on |
| 6c | off | on | on | off | off | on |
| 6d | off | on | on | off | on | off |
| 6e | off | on | off | on | on | off |
| 6f | on | off | off | on | on | off | the end points of the space vectors 6b, 6d and 6f. This corresponds to a reduced voltage $U_2$. This is reflected in that, as already explained, the electrical resistance of an electric motor operated in star-connected fashion increases.

FIG. 3a shows the complete design of an inverter 1 and an electric motor as inductive load 4. The inverter 1 receives a DC voltage 2 at its input 1a and outputs an alternating current 4a with phases U, V and W at its output 1b. Phase U is actuated via the first half-bridge 5a and is connected there optionally via the switching element 3a to the positive terminal or via the switching element 3d to the negative terminal of the DC voltage 2. Phase V is actuated via the second half-bridge 5b and is connected there optionally via the switching element 3b to the positive terminal or via the switching element 3e to the negative terminal of the DC voltage 2. Phase W is actuated via the third half-bridge 5c and is connected there optionally via the switching element 3c to the positive terminal or via the switching element 3f to the negative terminal of the DC voltage 2.

Each of the phases U, V, W feeds one of the windings 11, 12, 13 of the electric motor 4, wherein these three windings 11, 12, 13 have a common ungrounded neutral point 8. The windings 11, 12, 13 have not only inductances L but also ohmic resistances $R_U$, $R_V$ and $R_W$, respectively, connected in series therewith.

FIG. 3b shows the effect of these ohmic resistances without the disconnection, provided in accordance with the method, of whole half-bridges 5a-5c. When the alternating current 4a is conducted, for example, starting from the positive terminal of the DC voltage 2, via the first half-bridge 5a, through the first winding 11 with resistance $R_U$, the return line to the negative terminal can only take place via the parallel circuit comprising the winding 12 with resistance $R_V$ and the winding 13 with resistance $R_W$.

FIG. 3c shows the effect that the complete disconnection of the third half-bridge 5c has on the total resistance. Now only the second winding 12 with resistance $R_V$ is available for the return line. The total resistance therefore increases.

The invention claimed is:

1. A method (100) for operating an inverter (1), the method comprising:
connecting at least one of three AC phases (U, V, W) of an inductive load (4) to a positive terminal or a negative terminal of a DC voltage (2) provided at the input (1a) of the inverter (1) by means of driving of switching elements (3a-3f) arranged in three half-bridges (5a-5c), wherein the switching states of the switching elements (3a-3f) are changed by means of revolving space vector modulation (110), wherein, in addition, in the case of modulation between space vectors (6a-6f) which have identical switching states of the respective switching elements (3a, 3d; 3b, 3e; 3c, 3f) with respect to at least one half-bridge (5a-5c), such a half-bridge (5a-5c) remains completely switched off (120).

2. The method (100) as claimed in claim 1, wherein, within a coherent sector (7a-7c) in the space vector diagram in which the switching state of the switching elements (3a, 3d; 3b, 3e; 3c, 3f) associated with at least one half-bridge (5a-5c) remains the same, such a half-bridge (5a-5c) remains completely switched off (121).

3. The method (100) as claimed in claim 1, wherein the space vector modulation (110) only takes place between active space vectors (6a-6f) (111) which represent states in which a voltage which is different than zero is present between at least two of the AC phases (U, V, W).

4. The method (100) as claimed in claim 1, wherein the space vector modulation (110) is subjected to open-loop and/or closed-loop control (112) with the aim that a three-phase alternating current (4a) with a preset rms value which commutates in the sense of a rotating field flows through the inductive load (4).

5. The method (100) as claimed in claim 1 wherein an electric motor is selected as inductive load (4) (105).

6. The method as claimed in claim 5, wherein the electric motor is operated in star-connected fashion (105a) with an ungrounded neutral point (8).

7. The method (100) as claimed in claim 1, wherein an operating phase (4') of the inductive load (4) is selected (106) in which the inductive load (4) is operated at a maximum of 20% of its rated power.

8. A non-transitory, computer-readable medium, containing instructions which, when executed on a computer cause the computer to control an inverter to:
connect at least one of three AC phases (U, V, W) of an inductive load (4) to a positive terminal or a negative terminal of a DC voltage (2) provided at the input (1a) of the inverter (1) by means of driving of switching elements (3a-3f) arranged in three half-bridges (5a-5c), wherein the switching states of the switching elements (3a-3f) are changed by means of revolving space vector modulation (110), wherein, in addition, in the case of modulation between space vectors (6a-6f) which have identical switching states of the respective switching elements (3a, 3d, 3b, 3e, 3c, 3f) with respect to at least one half-bridge (5a-5c), such a half-bridge (5a-5c) remains completely switched off (120).

* * * * *